United States Patent
Sarkas et al.

(10) Patent No.: US 10,756,774 B2
(45) Date of Patent: Aug. 25, 2020

(54) NONLINEAR INTERFERENCE CANCELLATION

(71) Applicant: Apple Inc., Cupertino, CA (US)

(72) Inventors: Ioannis Sarkas, Redwood City, CA (US); Elmar Wagner, Taufkirchen (DE)

(73) Assignee: APPLE INC., Cupertino, CA (US)

(*) Notice: Subject to any disclaimer, the term of this patent is extended or adjusted under 35 U.S.C. 154(b) by 29 days.

(21) Appl. No.: 16/224,658

(22) Filed: Dec. 18, 2018

(65) Prior Publication Data

US 2020/0195296 A1    Jun. 18, 2020

(51) Int. Cl.
| | |
|---|---|
| *H04B 1/12* | (2006.01) |
| *H04B 1/525* | (2015.01) |
| *H04B 7/0426* | (2017.01) |
| *H04B 7/0417* | (2017.01) |
| *H04B 1/04* | (2006.01) |

(52) U.S. Cl.
CPC .......... *H04B 1/525* (2013.01); *H04B 1/0475* (2013.01); *H04B 7/0417* (2013.01); *H04B 7/0426* (2013.01)

(58) Field of Classification Search
CPC . H04B 1/1027; H04B 1/126; H04L 25/03305; H04W 52/243
See application file for complete search history.

(56) References Cited

U.S. PATENT DOCUMENTS

| | | | |
|---|---|---|---|
| 9,356,632 B2 | 5/2016 | Weissman et al. | |
| 9,762,266 B2 | 9/2017 | Weissman et al. | |
| 2015/0126146 A1* | 5/2015 | Wang | H04B 1/1027 455/296 |
| 2016/0049972 A1* | 2/2016 | Moher | H04B 1/12 370/277 |
| 2019/0305831 A1* | 10/2019 | Freisleben | H04B 7/0413 |

FOREIGN PATENT DOCUMENTS

WO    2018055435 A1    3/2018

OTHER PUBLICATIONS

Zenteno, et al.; "MIMO Subband Volterra Digital Predistortion for Concurrent Aggregated Carrier Communications"; IEEE Transactions on Microwave Theory and Techniques, vol. 65, No. 3, Mar. 2017.

(Continued)

*Primary Examiner* — Mansour Oveissi
(74) *Attorney, Agent, or Firm* — Fletcher Yoder PC

(57) ABSTRACT

The representative embodiments discussed in the present disclosure relate to techniques in which a transmitter may operate in an uplink multiple-input, multiple-output (MIMO) mode of operation. More specifically, in some embodiments, the transmitter may concurrently transmit a first and a second signal within the same frequency band via a first and second antenna, respectively. Further, in some embodiments, the transmitter may include circuitry and/or logic to offset nonlinear interference present in the transmitted signals as a result of antenna coupling between the first and second antenna and a nonlinear element (e.g., a power amplifier) within the transmitter.

20 Claims, 8 Drawing Sheets

(56) References Cited

OTHER PUBLICATIONS

Palaskas, et al.; "A 5-GHz 108-Mb/s 2x2 MIMO Transceiver RFic With Fully Integrated 20.5-dBm P1dB Power Amplifiers in 90-nm CMOS"; IEEE Journal of Solid-State Circuits, vol. 41, No. 12, Dec. 2006.
Korpi, et al.; "Adaptive Nonlinear Digital Self-interference Cancellation for Mobile Inband Full-Duplex Radio: Algorithms and RF Measurements"; Department of Electronics and Communications Engineering, Tampere University of Technology, Finland, 2015.
Hua, et al.; "Coupling Effects of Dual SiGe Power Amplifiers for 802.11n MIMO Applications"; Department of Electrical Engineering and Graduate Institute of Electronics Engineering, National Taiwan University, Taiwan, R. O. C.; IEEE Radio Frequency Integrated Circuits (RFIC) Symposium, 2006.

\* cited by examiner

NONLINEAR INTERFERENCE CANCELLATION

BACKGROUND

The present disclosure relates generally to cellular and wireless devices and, more particularly, to cellular and wireless devices having a transceiver capable of reducing nonlinear interference (e.g., cross-modulation products) present in signals transmitted using an uplink multiple-input, multiple-output (UL-MIMO) mode of operation.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transceivers are commonly included in various electronic devices, and particularly, portable electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. Certain types of transceivers, known as wireless transceivers, may be used to generate wireless signals to be transmitted by way of an antenna in the transceiver. Moreover, certain transceivers include multiple antennas such that each antenna may concurrently transmit a respective signal within the same frequency band over a wireless channel (e.g., air). However, concurrently transmitting signals from antennas that are proximate to one another (e.g., within the same transceiver) may introduce distortion, such as nonlinear interference, into the transmitted signals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As described in greater detail below, the transceiver may include multiple antennas to operate in an uplink multiple-input, multiple output (UL-MIMO) (e.g., spatial multiplexing) mode. As such, two or more of the antennas may concurrently transmit a respective data signal within the same frequency band. However, because the antennas are transmitting within the same frequency band concurrently, the antennas may become coupled. For instance, a first antenna of a first transmitter within the transceiver may transmit a first signal while simultaneously receiving a second signal transmitted by a second antenna of a second transmitter of the transceiver. Similarly, the second antenna may receive the first signal while transmitting the second signal. Accordingly, nonlinear elements of the transceiver, such as a power amplifier, may cross-modulate the signal transmitted at the first antenna with signals received from proximate, coupled antennas (e.g., the second antenna). As a result, the first antenna may transmit the first signal with nonlinear interference (e.g., cross-modulation products and/or intermodulation distortion), and the second antenna may transmit the second signal with nonlinear interference, which may degrade certain performance characteristics, such as the adjacent channel leakage ratio (ACLR) and/or the error vector magnitude (EVM) of the transceiver.

Accordingly, to limit the distortion caused by the cross-modulation of signals, the transceiver may include circuitry and/or logic, such as a multiple-input, multiple output intermodulation (MIMO IMD) cancellation block, implemented to estimate cross-modulation products present in a transmitted signal. The MIMO IMD cancellation block may estimate the cross-modulation products based in part on the signals expected to be transmitted by the transceiver before distortion is introduced by nonlinear interference (e.g., expected signals) and the signals transmitted by the transceiver (e.g., transmission signals), which may include nonlinear interference. In some embodiments, for example, the MIMO IMD cancellation block may estimate the cross-modulation products and scale the estimated cross-modulation products using a set of weight factors based in part on a model, such as a Volterra model. Further, the transceiver may inject the inverse of the estimated cross-modulation products into the expected signals to offset the nonlinear interference predicted to be present in the transmission signals.

Accordingly, the representative embodiments discussed in the present disclosure relate to techniques in which nonlinear interference resulting from antenna coupling may be reduced in transmitted signals. More specifically, in some embodiments, the nonlinear interference may be predicted based on expected signals, transmission signals, and a set of weight factors. The expected signals may then be modified based on the prediction to offset the nonlinear interference. Further, in some embodiments, a method to determine the set of weight factors based in part on one or more of the expected signals and one or more of the transmission signals may be employed regularly and/or based in part on certain conditions of the transceiver and/or an electronic device such that the efficacy of the predictions may be improved.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
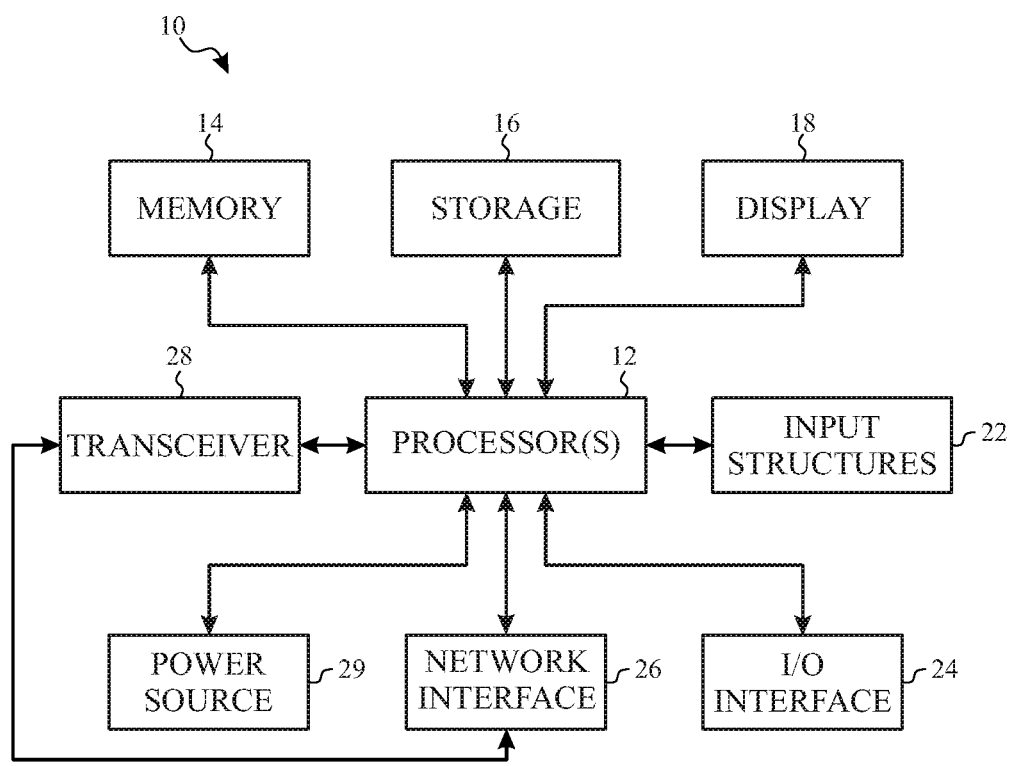
FIG. 1 is a schematic block diagram of an electronic device including a transceiver, in accordance with an embodiment.

With the foregoing in mind, a general description of suitable electronic devices that may employ a transceiver capable of reducing nonlinear interference present in signals transmitted in an uplink multiple-input, multiple-output (UL-MIMO) mode of operation will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

Figure 2:
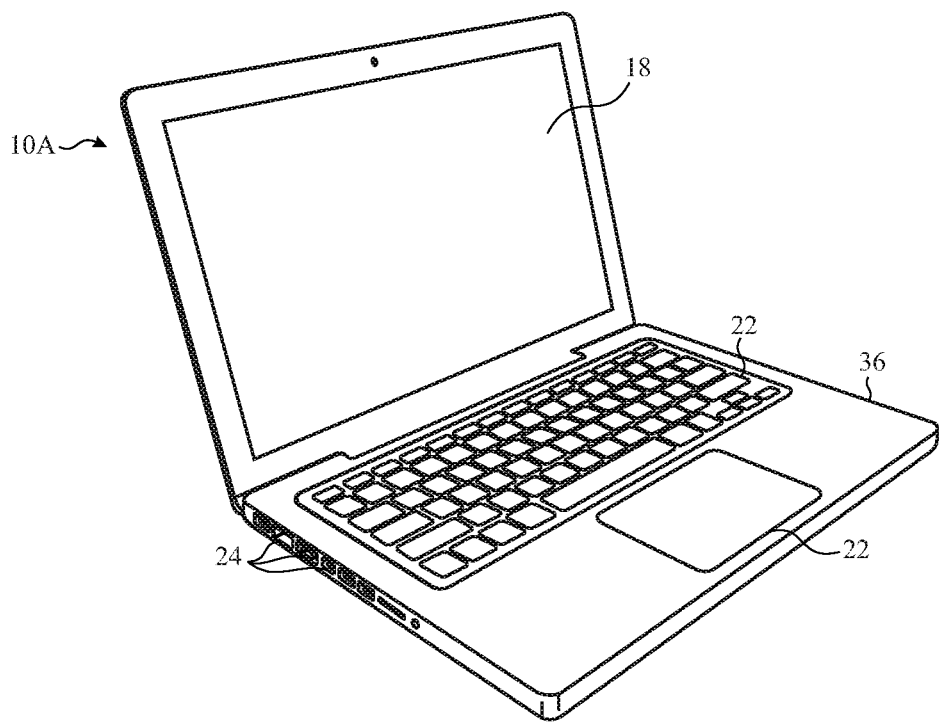
FIG. 2 is a perspective view of a notebook computer representing an embodiment of the electronic device of FIG. 1.
Figure 3:
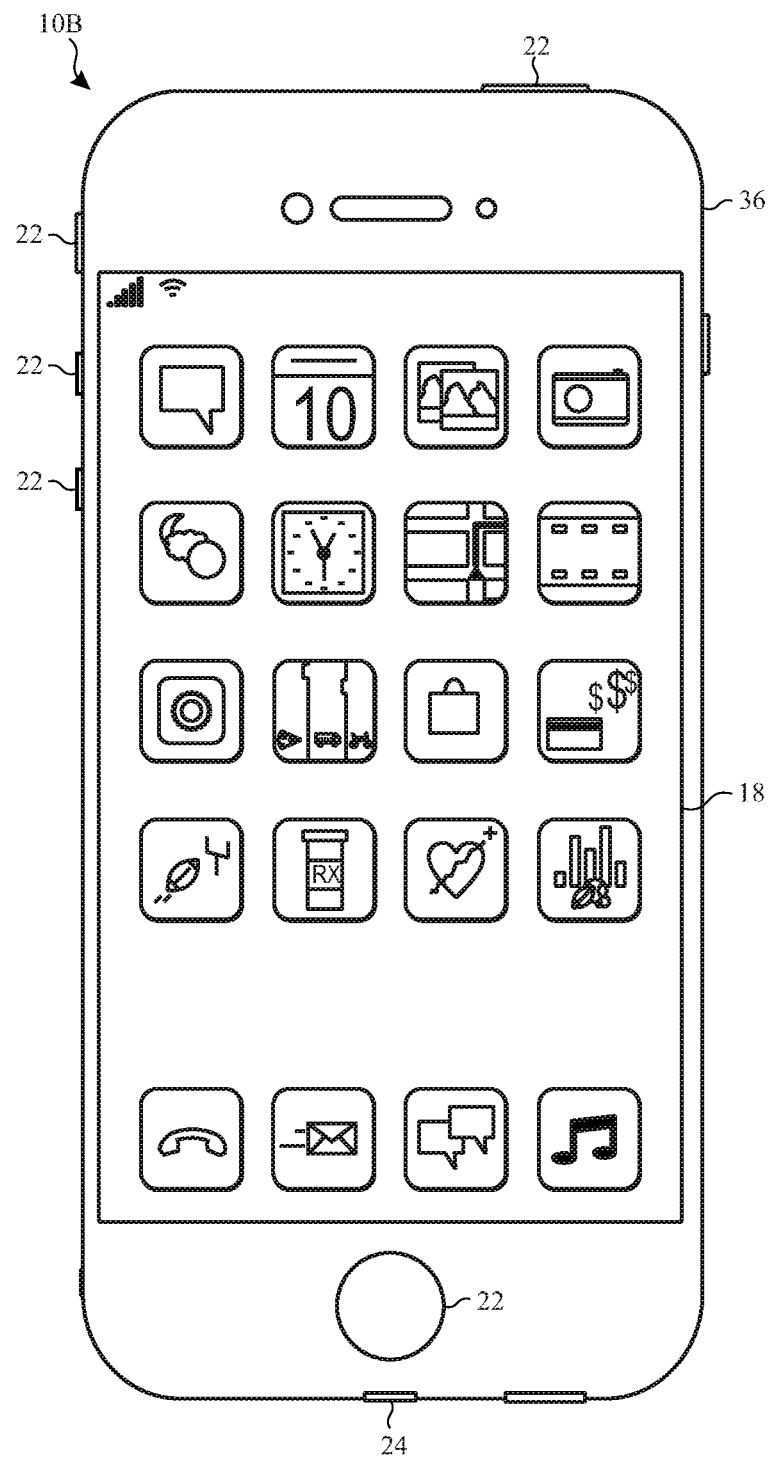
FIG. 3 is a front view of a hand-held device representing another embodiment of the electronic device of FIG. 1.
Figure 4:
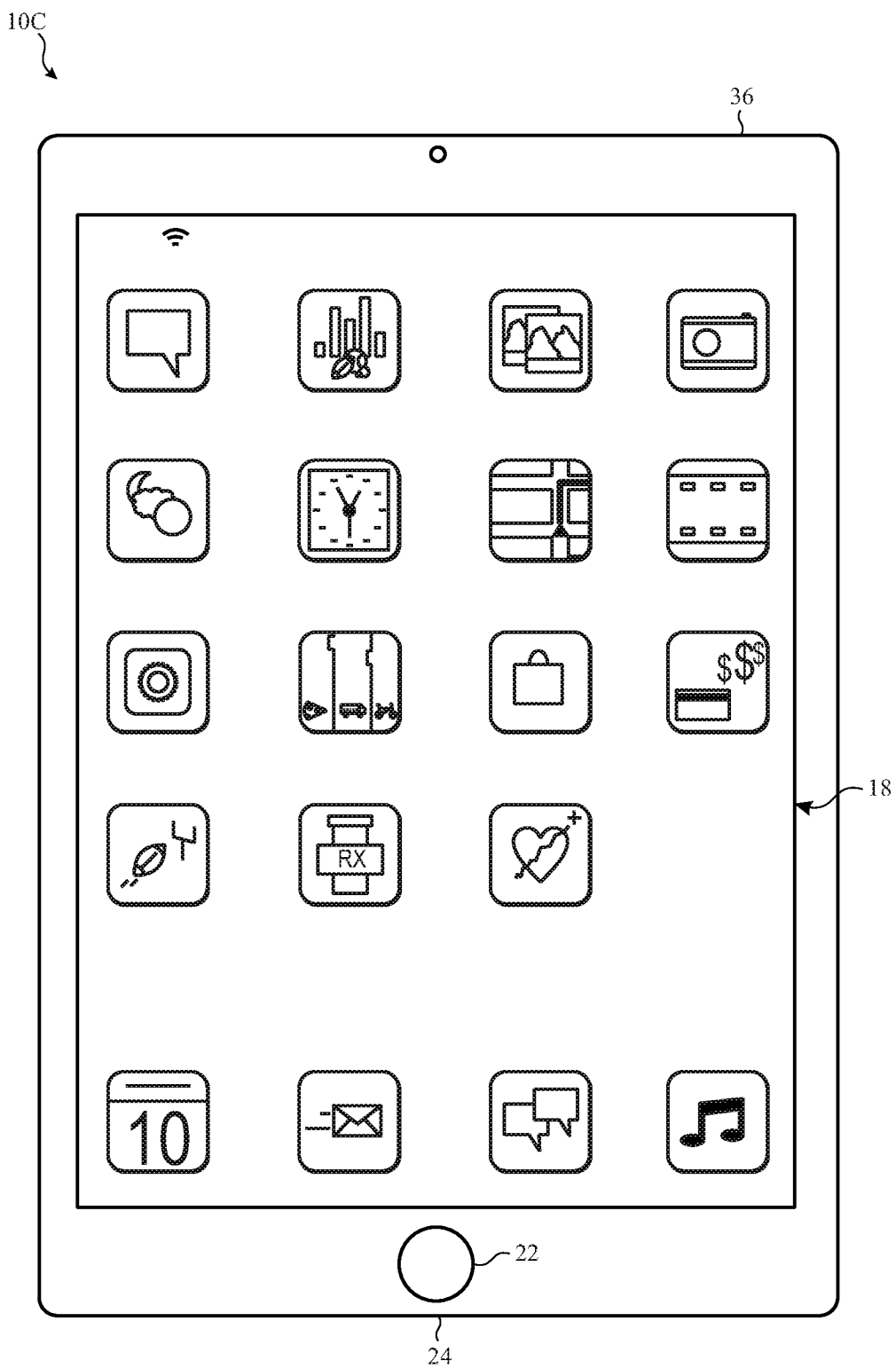
FIG. 4 is a front view of another hand-held device representing another embodiment of the electronic device of FIG. 1.
Figure 5:
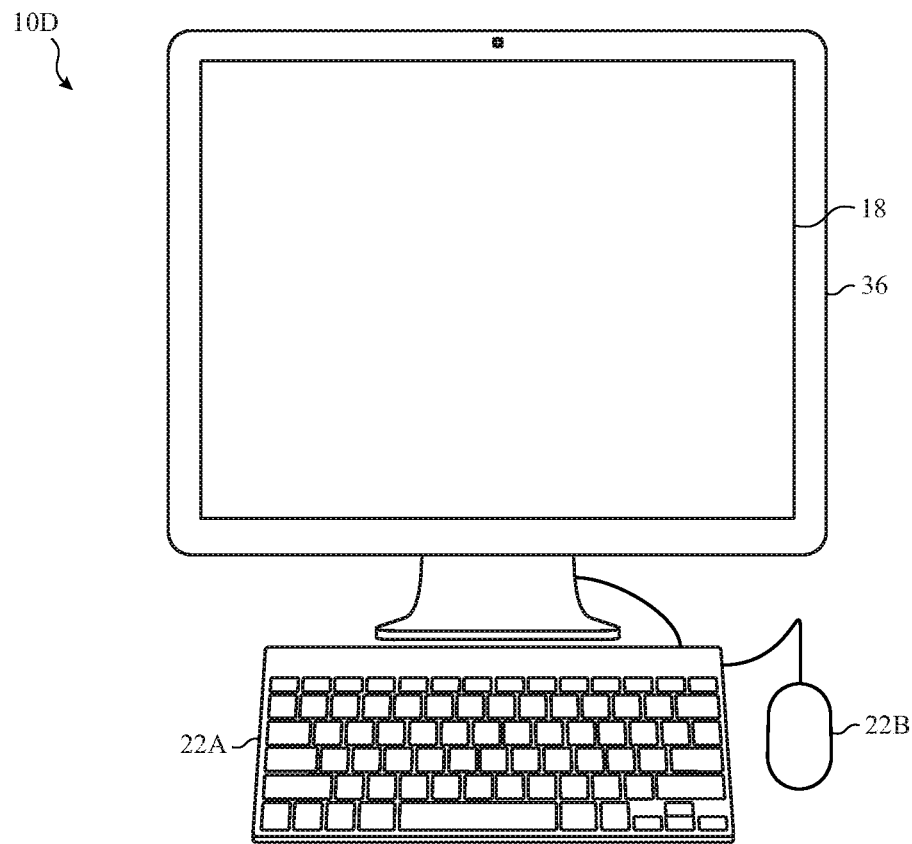
FIG. 5 is a front view of a desktop computer representing another embodiment of the electronic device of FIG. 1.
Figure 6:
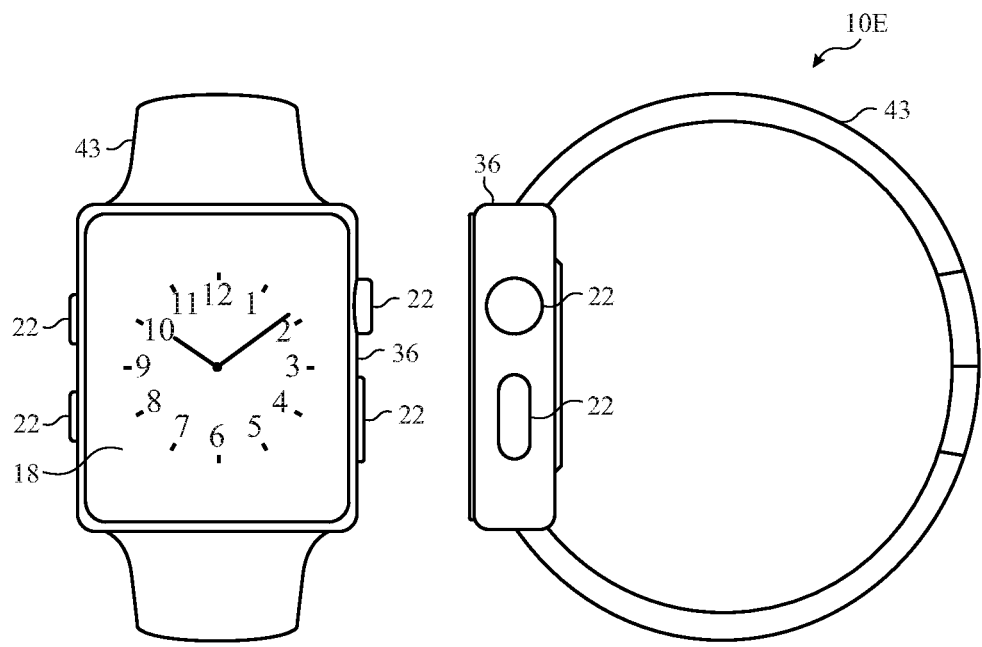
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, 4th generation (4G) cellular network, $5^{th}$ generation (5G) cellular network, long term evolution (LTE) cellular network, long term evolution enhanced license assisted access (LTE-eLAA) cellular network, or long term evolution advanced (LTE-A) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, 5G, LTE, and so forth), the electronic device 10 may include a transceiver 28. The transceiver 28 may include any circuitry that may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, 5G, and LTE, LTE-eLAA, and LTE-A cellular networks), WiMAX networks, mobile WiMAX networks, ADSL and VDSL networks, DVB-T and DVB-H networks, UWB networks, and so forth. Further, as described in greater detail below, the transceiver 28 may include two or more antennas, which may each transmit and/or receive data. Accordingly, in some embodiments, the transceiver 28 may use the two or more antennas to operate in an uplink multiple-input, multiple output (UL-MIMO) (e.g., spatial multiplexing) mode of operation. As such, the transceiver 28 may concurrently transmit multiple data signals within the same frequency band, which may increase the bit rate of data transmitted by the transceiver 28. Moreover, using UL-MIMO, the transceiver 28 may support data communication in certain wireless applications, such as a 5G and/or LTE network. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal serial bus (USB), or other similar connector and protocol.

Input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
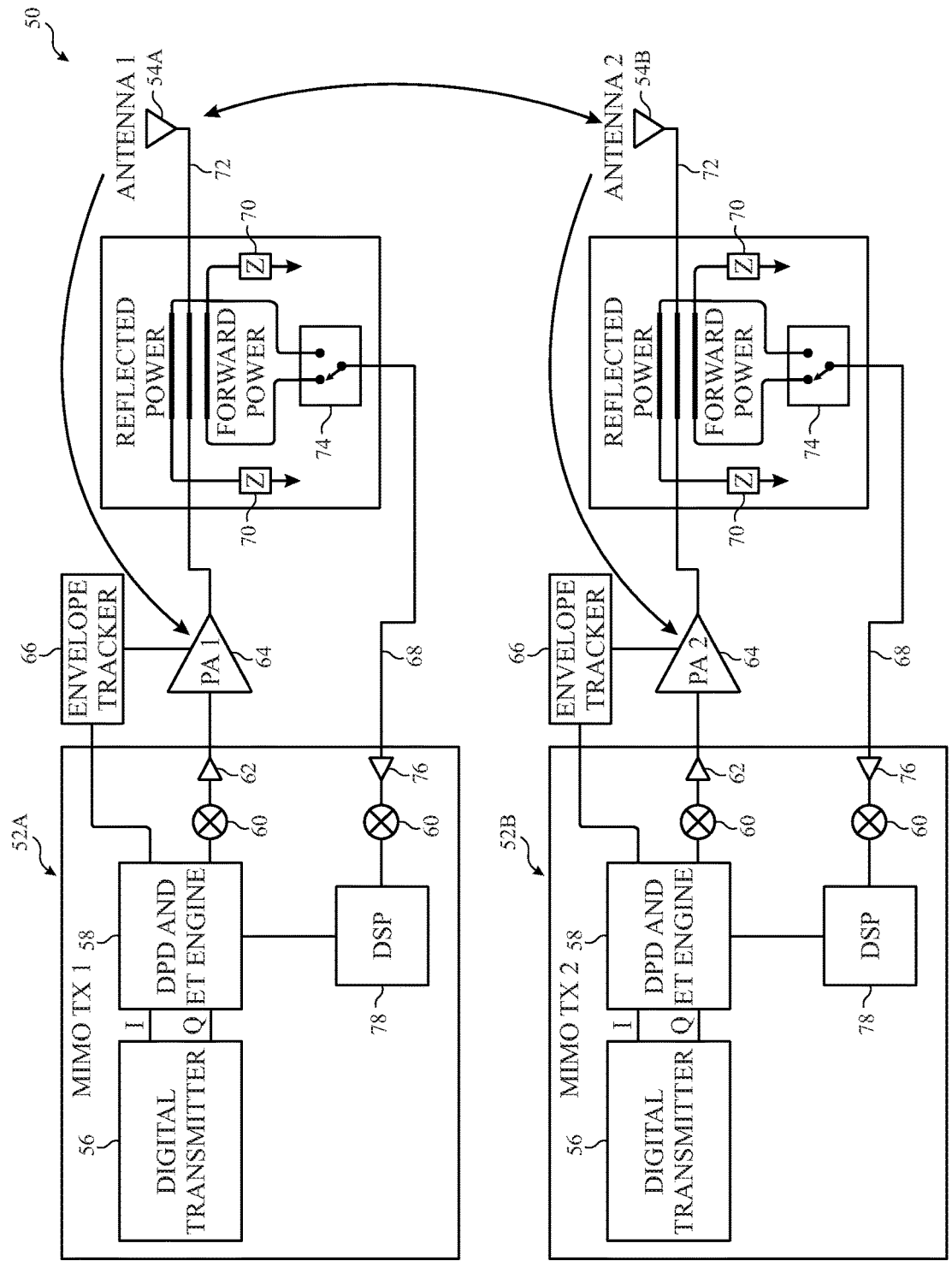
FIG. 7 is a schematic block diagram of an embodiment of a transmitter of the transceiver that may exhibit non-linear interference, in accordance with an embodiment.

As previously noted above, each embodiment (e.g., notebook computer 10A, handheld device 10B, handheld device 10C, computer 10D, and wearable electronic device 10E) of the electronic device 10 may include a transceiver 28. With the foregoing in mind, FIG. 7 depicts a schematic block diagram of an embodiment of a transmitter 50 within the transceiver 28, which may be disposed within a modem (not shown) of the electronic device 10. In the illustrated embodiment, the transmitter 50 is separate from the receiver within the transceiver 28, but in some embodiments, the transceiver 28 may include a transmitter 50 and a receiver combined into a single unit. Further, the various functional blocks shown in FIG. 7 may include hardware elements (including circuitry), software elements (including computer code stored on a computer-readable medium) or a combination of both hardware and software elements. It should also be noted that FIG. 7 is merely one example of a particular implementation and is intended to illustrate the types of components that may be present in the transmitter 50. As such, functional blocks may be added or omitted, and their arrangement within the transmitter 50 may be modified.

To facilitate uplink multiple-input, multiple-output (UL-MIMO) (e.g., spatial multiplexing) techniques for data transmission, the transmitter 50 may include a number of multiple-input, multiple-output (MIMO) transmitters 52 (e.g., 52A, 52B). More specifically, the transmitter 50 may include a number of MIMO transmitters 52 that are each implemented to concurrently transmit a respective data signal within the same frequency band via a respective antenna 54. For example, a first MIMO transmitter 52A may be implemented to wirelessly transmit a first data signal via a first antenna 54A, while a second MIMO transmitter 52B may be implemented to wirelessly transmit a second data signal in the same frequency band as the first data signal via a second antenna 54B.

As illustrated, each MIMO transmitter 52 (e.g., 52A, 52B) may include logic and/or circuitry suitable to prepare the respective data signals for transmission. For example, the MIMO transmitters 52 may include digital transmitter circuitry 56 implemented to receive and/or identify a digital signal to be wirelessly transmitted. Further, the MIMO transmitters 52 may include a digital pre-distortion (DPD) and envelope tracking (ET) engine 58. The DPD and ET engine 58 may apply a gain to the signal identified by the digital transmitter circuitry 56. The DPD and ET engine 58, as well as other suitable gain control elements (e.g., gain control element 60) in the MIMO transmitters 52, may apply gain to the signal so that the amplitude of an output signal of the DPD and ET engine 58 is within a suitable operating range of the circuitry that may receive the output signal of the gain control element 60 as an input. More specifically, the DPD and ET engine 58 may apply distortion to the signal to offset distortion (e.g., gain and/or phase distortion) that the power amplifier 64 may introduce. That is, for example, the DPD and ET engine 58 may introduce distortion intended to have the opposite effect on the signal compared to the distortion (e.g., gain and/or phase distortion) the power amplifier 64 may introduce, as described in greater detail below.

A digital-to-analog converter (DAC) 62 may convert the output of the DPD and ET engine 58 and/or the gain control element 60 from a digital signal to an analog signal to prepare the signal for transmission across an analog channel (e.g., air). The power amplifier 64 may receive the output of the DAC 62 and may amplify the analog signal for transmission across a channel. Additionally or alternatively, while not illustrated, a mixer may receive the output of the DAC 62 as an input and adjust (e.g., shift) the frequency of the analog signal to a suitable frequency for the channel the analog signal will be transmitted on. The mixer may additionally or alternatively perform frequency modulation (FM) or amplitude modulation (AM) to modify the frequency or amplitude of the analog signal, respectively. The output of the mixer may then feed into an input of the power amplifier 64 for amplification suitable for signal transmission across a channel.

Further, in some embodiments, to control the power supplied to the power amplifier 64, which may control the amplification applied to the signal output by the MIMO transmitters 52, each of the MIMO transmitters 52 may contain an envelope tracker 66. The envelope tracker 66 may include suitable logic and/or circuitry, such as a dynamic voltage and/or current supply, to regulate the power supplied to the power amplifier 64 based at least in part on one or more characteristics (e.g., amplitude, envelope, and/or the like) of the signal identified at the digital transmitter circuitry 56 and/or the signal output by the DPD and ET engine 58. Accordingly, in some embodiments, the DPD and ET engine 58 may provide information related to the one or more characteristics of a signal to the envelope tracker 66, and the envelope tracker 66 may control the amplification applied at the power amplifier 64 to the signal based in part on the received information.

As further illustrated, the MIMO transmitters 52 may each include a feedback receiver path 68. The MIMO transmitters 52 may use the feedback receiver path 68 to capture information related to the signal transmitted at the antenna 54. Accordingly, the load 70 (e.g., impedance) applied to the transmission path 72 and/or the feedback receiver path 68 may be selected to receive data at the feedback receiver path 68 while minimizing the reflected power and/or maximizing the forward power of the transmission path 72. As such, in some embodiments, the load 70 applied to the transmission path 72 and/or the feedback receiver path 68 may be relatively low (e.g., 50 ohms).

In some embodiments, the feedback receiver path 68 may include a switch 74, which may route the signal output by the power amplifier 64 to the feedback receiver path 68 and/or the transmission path 72 (e.g., the antenna 54). Moreover, the feedback receiver path 68 may include an analog-to-digital converter (ADC) 76. The ADC 76 may convert the signal routed by the switch 74 to the feedback receiver path 68 from an analog signal suitable to be output over an analog channel (e.g., air) at the antenna 54 to a digital signal. A gain control element 60 may then adjust the gain of the digital signal so that the digital signal may be processed by digital signal processing (DSP) circuitry 78. The DSP circuitry 78 may include logic and/or circuitry suitable to determine the distortion (e.g., gain and/or phase distortion) introduced by the power amplifier 64 such that the DPD and ET engine 58 may offset this distortion, as discussed above.

While the DSP circuitry 78, the feedback receiver path 68, and/or the DPD and ET engine 58 may mitigate distortion (e.g., gain and/or phase distortion) caused by the power amplifier 64 in the signals transmitted by the antenna 54, the signals may be susceptible to several types of noise and/or distortion. More specifically, because each of the first MIMO transmitter 52A and the second MIMO transmitter 52B may concurrently transmit a respective signal in the same frequency band, the transmitted signals may include intermodulation products (e.g., cross-modulation products and/or nonlinear interference). For instance, the antennas 54 of the MIMO transmitters 52, which may be disposed proximate to one another in the electronic device 10, may become coupled together. As such, while the first antenna 54A is transmitting the first signal, the first antenna 54A may receive the second signal transmitted by the second MIMO transmitter 52B. Moreover, while the second antenna 54B is transmitting the second signal, the second antenna 54B may receive the first signal transmitted by the first MIMO transmitter 52A. In the first MIMO transmitter 52A, the second signal may propagate to the power amplifier 64. The power amplifier 64 may have finite reverse intermodulation distortion, which may mix the second signal (e.g., a coupled signal) and the input signal received from the DAC 62 (e.g., the signal to be transmitted at the first antenna 54A). Accordingly, the power amplifier 64 may cross-modulate the second signal (e.g., the coupled signal) and the input signal received from the DAC 62, which may result in a transmitted signal having intermodulation products and may degrade the adjacent channel leakage ratio (ACLR) and the error vector magnitude (EVM) of the first MIMO transmitter 52A and/or the transmitter 50. Further, at the second MIMO transmitter 52B, the first signal may propagate to the power amplifier 64, where the first signal and the input signal received from the DAC 62 may become cross-modulated. As such, the adjacent channel leakage ratio (ACLR) and the error vector magnitude (EVM) of the second MIMO transmitter 52B may also degrade as a result of antenna coupling with the first antenna 54A.

It may be appreciated that while cross-modulation of signals resulting from antenna coupling is described herein as occurring at the power amplifier 64, any suitable nonlinear element (e.g., circuitry) in the MIMO transmitters 52 may cross-modulate the signals. Moreover, the performance degradation (e.g., ACLR and/or EVM degradation) of the MIMO transmitters 52 resulting from the cross-modulation may be exacerbated by certain modes of the power amplifier 64 and/or additional nonlinear elements. For instance, in a cellular system, the power amplifier 64 may operate in an envelope tracking (ET) mode. In ET mode, the power amplifier 64 may apply nonlinear gain to input signals, as the power amplifier 64 may operate in constant compression (e.g., gain compression). On the other hand, in other modes of operation, the power amplifier 64 may apply more linear gain to the input signals. As a result, the effects of the cross-modulation may be more apparent (e.g., the performance degradation may increase) in an electronic device 10 with a power amplifier 64 operating in ET mode than in an electronic device 10 with a power amplifier 64 operation in another mode of operation. Moreover, while the cross-modulated signals are described as being concurrently transmitted, it may be appreciated that a delay may exist between the start of the transmission of the first signal and the start of the transmission of the second signal or vice versa and/or that a delay may exist between the end of the transmission of the first signal and the end of the transmission of the second signal or vice versa.

Figure 8:
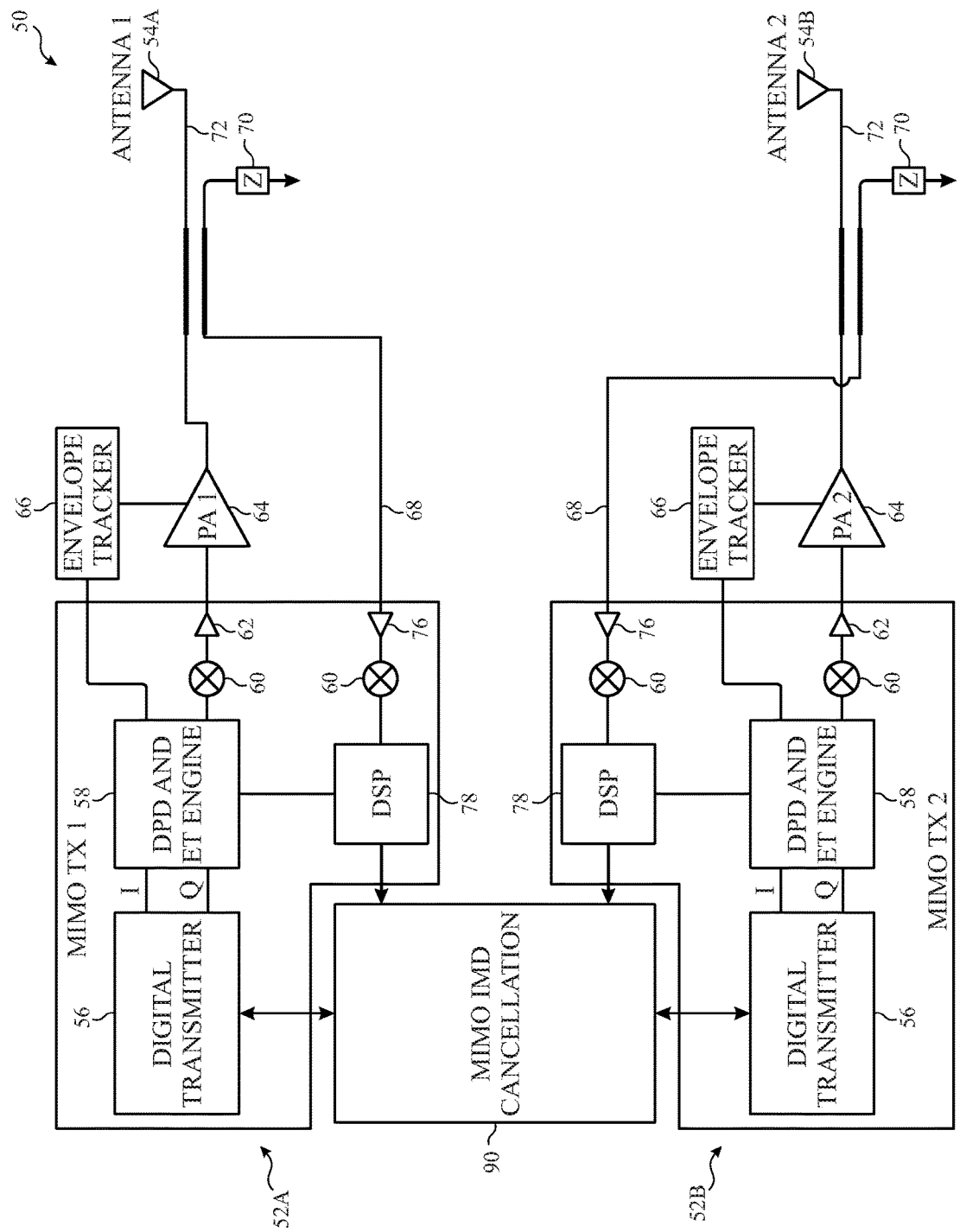
FIG. 8 is schematic block diagram of a transmitter including a multiple-input, multiple-output intermodulation distortion (MIMO IMD) cancellation block, in accordance with an embodiment.

Accordingly, in some embodiments, to limit distortion caused by the intermodulation products and/or cross-modulation described herein, the transmitter 50 may include a multiple-input, multiple-output intermodulation distortion (MIMO IMD) cancellation block 90, as shown in FIG. 8. The MIMO IMD cancellation block 90 may include circuitry and/or logic to determine the mixing products (e.g., the cross-mixing and/or intermodulation products) in each of a first transmission signal transmitted at the first antenna MA and a second transmission signal transmitted at the second antenna MB. Accordingly, the MIMO IMD cancellation block 90 may receive the first transmission signal received at the feedback receiver path 68 of the first MIMO transmitter 52A and may receive the second transmission signal received at the feedback receiver path 68 of the second MIMO transmitter 52B. Further, the MIMO IMD cancellation block 90 may receive the first signal expected to be output at the antenna MA (e.g., an expected first signal) from the first MIMO transmitter 52A if mixing products resulting from a respective coupled signal were not present and may receive the second signal expected to be output at the antenna MB (e.g., an expected second signal) from the second MIMO transmitter 52B if mixing products from a respective coupled signal were not present. Based on the first transmission signal, the second transmission signal, the expected first signal, and the expected second signal, the MIMO IMD cancellation block may determine the mixing products present in each of the first transmission signal (e.g., a distorted version of the expected first signal) and the second transmission signal (e.g., a distorted version of the expected second signal), as described in greater detail below. Moreover, the MIMO IMD cancellation block 90 may provide the inverse of the identified mixing products in the first transmission signal to the first MIMO transmitter 52A and may provide the inverse of the identified mixing products in the second transmission signal to the second MIMO transmitter 52B. As such, the MIMO transmitters 52 may cancel the respective mixing products from the expected signals (e.g., the expected first signal, the expected second signal) to offset the distortion later included in the transmission signals (e.g., the first transmission signal, the second transmission signal) due to cross-modulation. Moreover, in some embodiments, the transmitter 50 may meet and/or exceed the standards of the 3rd Generation Partnership Project (3GPP), such as a certain ACLR and/or EVM, by using the MIMO IMD cancellation block 90 during UL-MIMO, which may facilitate use of a 5G and/or LTE network.

Figure 9:
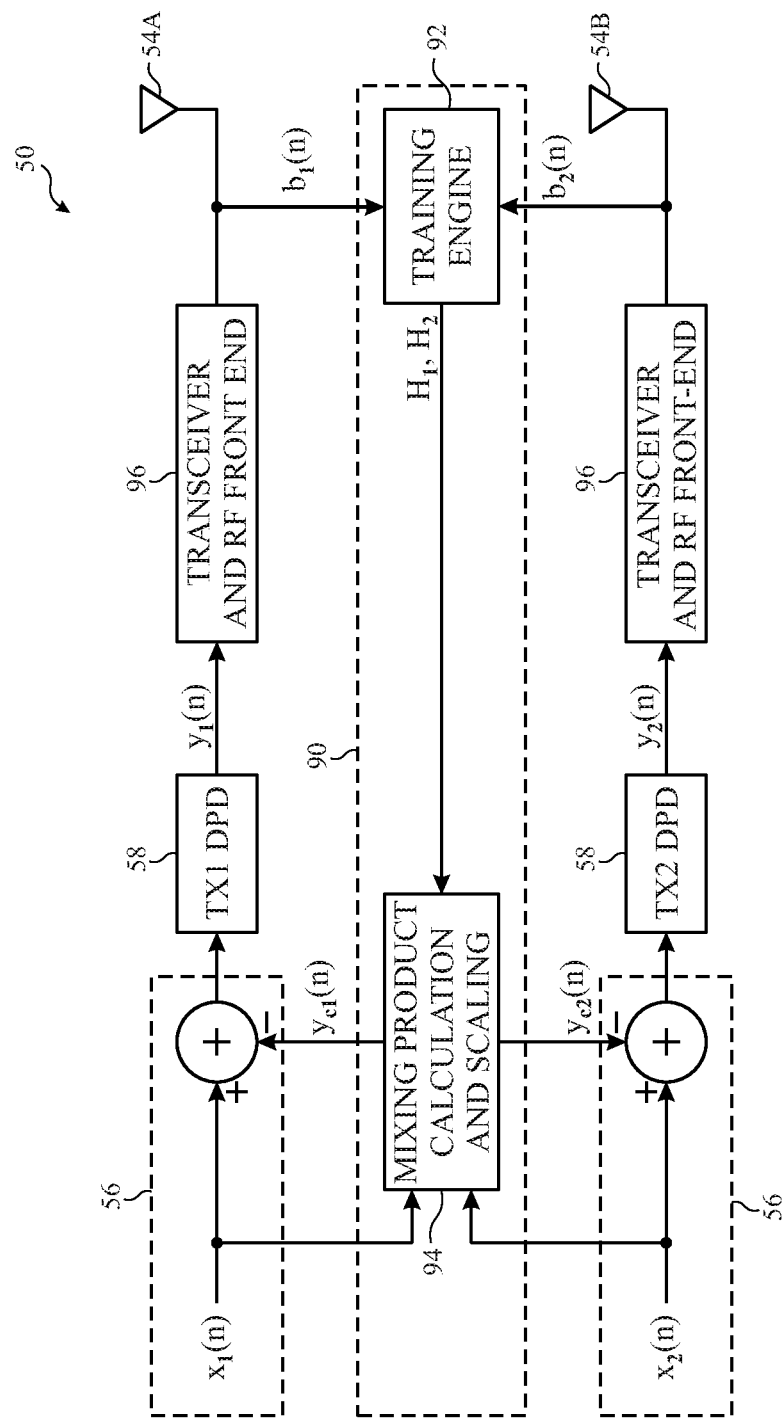
FIG. 9 is a schematic block diagram of the MIMO IMD cancellation block of FIG. 8, in accordance with an embodiment.

Turning now to FIG. 9, a more detailed embodiment of the MIMO IMD cancellation block 90 is shown. In some embodiments, the MIMO IMD cancellation block 90 may determine the mixing-products present in a signal transmitted by the first MIMO transmitter 52A using a simplified Volterra model (e.g., a Volterra series). Generally, using the simplified Volterra model, the MIMO IMD cancellation block 90 may determine a set of weight factors (e.g., coefficients) and may determine the mixing products that may result from an expected signal (e.g., a signal to be transmitted at the first antenna MA) and an expected coupled signal (e.g., a signal expected to be transmitted at the second antenna MB) based on the set of weight factors, the expected signal, and the expected coupled signal. The mixing products may then be cancelled from an expected signal before the expected signal is transmitted to offset the distortion resulting from the mixing products. Accordingly, as illustrated, the MIMO IMD cancellation block 90 may include a training engine 92, which may be used to calculate the set of weight factors, and a mixing product calculation and scaling block 94, which may be used to calculate the mixing products.

For simplicity, portions of the first MIMO transmitter 52A and the second MIMO transmitter 52B are omitted and certain functional blocks (e.g., gain control element 60, DAC 62, envelope tracker 66, power amplifier 64) are represented by a transceiver and radio-frequency (RF) front-end block 96 in the illustrated embodiment. However, it may be appreciated that the MIMO transmitters 52 may include each of the components described herein and/or illustrated in FIG. 8. Further, the components of the transmitter 50 described herein (e.g., digital transmitter circuitry 56, DPD and ET engine 58, gain control element 60, DAC 62, power amplifier 64, envelope tracker 66, and/or the like) may remain unchanged (e.g., may operate the same) in FIGS. 8 and 9, even with the addition of the MIMO IMD cancellation block 90. Moreover, the MIMO IMD cancellation block 90 may be communicatively coupled via input and/or output circuitry (e.g., wiring and/or interconnects) to the first MIMO transmitter 52A and/or the second MIMO transmitter 52B at the digital transmitter circuitry 56, at an adder of the digital transmitter circuitry 56, at the feedback receiver path 68, at the DSP circuitry 78, and/or the like, as illustrated in FIGS. 8 and 9. Thus, embodiments described herein are intended to be illustrative and not limiting.

In the illustrated embodiment, $x_1(n)$ represents the expected first signal of the first MIMO transmitter 52A (e.g., the expected signal), and $x_2(n)$ represents the expected second signal of the second MIMO transmitter 52B, which represents an expected coupled signal relative to the expected first signal. Further, $y_{c1}(n)$ represents the mixing products (e.g., interference) predicted to be present in the first transmission signal ($b_1(n)$) transmitted at the first antenna 54A as a result of antenna coupling with the second antenna 54B. Additionally, $y_{c2}(n)$ represents the mixing products (e.g., interference) predicted to be present in the second transmission signal ($b_2(n)$) transmitted at the second antenna 54B as a result of antenna coupling with the first antenna 54A. The second transmission signal ($b_2(n)$) may additionally represent a coupled transmission relative to the first transmission signal ($b_1(n)$). Accordingly, $y_1(n)$ represents an updated (e.g., modified) first signal, which may include the inverse of the mixing products ($-y_{c1}(n)$) injected into the expected first signal, and $y_2(n)$ represents an updated (e.g., modified) second signal, which may include the inverse of the mixing products ($-y_{c2}(n)$) injected into the expected second signal. Further, $H_1$ may represent a first set of weight factors, which may correspond to mixing product scaling factors for the mixing products predicted to be present in the first transmission signal, and $H_2$ may represent a second set of weight factors, which may correspond to mixing product scaling factors for the mixing products predicted to be present in the second transmission signal.

In some embodiments, the mixing product calculation and scaling block 94 may estimate and/or predict the mixing products resulting from third order nonlinearity based in part on the equation:

$$y_{3c}(n) = h_{3,1}|x_1(n)|^2 x_2(n) + h_{3,2} x_1^2(n) x_2^*(n) + h_{3,3} x_1^*(n) x_2^2(n) + h_{3,4} x_1(n)|x_2(n)|^2,$$

where, as illustrated in FIG. 9, $x_1(n)$ represents the expected first signal of the first MIMO transmitter 52A (e.g., the expected signal), $x_2(n)$ represents the expected second signal of the second MIMO transmitter 52B (e.g., the expected coupled signal), $y_{3c}(n)$ represents the mixing products resulting from third order nonlinearity of the expected signal and the expected coupled signal, * represents the conjugate function, and $h_{i,j}$ represents the set (e.g., vector) of weight factors, where i corresponds to the harmonic order and j corresponds to the coefficient order of each weight factor. Further, the first expected signal ($x_1(n)$) and/or the expected coupled signal ($x_2(n)$) may represent narrowband modulated signals represented by complex envelope notation in discrete time. In some embodiments, for example, the first expected signal ($x_1(n)$) and/or the expected coupled signal ($x_2(n)$) may be sampled by the MIMO IMD cancellation block 90 and/or the transmitter 50 at a rate twice the Nyquist rate or greater of the channel bandwidth and/or of the signals (e.g., the first expected signal, the expected coupled signal, the transmission signals, and/or the like) to be represented in discrete time. In such embodiments, the respective harmonics of the signals in the evolved universal terrestrial radio access (E-UTRA) ACLR1 (e.g., LTE) zone may be captured.

In some embodiments, the expected coupled signal ($x_2(n)$) may be much weaker than the expected signal ($x_1(n)$). More specifically, the coupled transmission signal ($b_2(n)$) may be much weaker than the first transmission signal ($b_1(n)$) at the first antenna MA. Accordingly, the weights $h_{3,3}$ and $h_{3,4}$ may be neglected to simplify the equation. Moreover, in practice, the expected coupled signal ($x_2(n)$) may be delayed and filtered before it reaches a nonlinear element (e.g., the power amplifier 64) in the transmitter 50. Accordingly, a memory term (m) may be introduced to terms involving the expected coupled signal ($x_2(n)$), and in some embodiments, the memory term (m) may be ignored for the expected signal ($x_1(n)$) for simplicity. As such, the equation to determine the mixing products may be re-expressed as:

$$y_{3c}(n) \cong \sum_{m=0}^{M} h_{1,1}(m) x_2(n) + h_{3,1}(m)|x_1(n)|^2 x_2(n-m) + h_{3,2}(m) x_1^2(n) x_2^*(n-m),$$

where M represents the memory depth. In some embodiments, the memory depth may be set based in part on the length of the delay in the expected coupled signal ($x_2(n)$), which may be estimated based in part on the structure of the second MIMO transmitter 52B and/or determined experimentally. Additionally or alternatively, the memory depth may be set to capture a certain number of samples of the expected coupled signal ($x_2(n)$).

Further, in some embodiments, a linear coupled transmission signal ($b_2(n)$) term (e.g., a second order term) may be present at the output of the first MIMO transmitter 52A. Accordingly, the total interference (mixing products) to be reduced and/or cancelled may be estimated by the equation:

$$y_{c1}(n) \cong \sum_{m=0}^{M-1} h_{1,1}(m) x_2(n-m) + h_{3,1}(m)|x_1(n)|^2 x_2(n-m) + h_{3,2}(m) x_1^2(n) x_2^*(n-m),$$

where the inverse of the total interference signal ($-y_{c1}(n)$) may be output from the mixing product calculation and scaling block 94 such that adding the expected signal with the output of the mixing product calculation and scaling block 94 may offset (e.g., reduce) distortion introduced by cross-modulation during transmission of the first transmission signal ($b_1(n)$). Accordingly, the updated signal ($y_1(n)$) output by the DPD and ET engine 58 may represent the expected first signal with the inverse of the total interference signal injected and adjusted with digital pre-distortion to offset distortion of the power amplifier 64, as discussed above. Further, the power amplifier 64 may amplify the updated signal ($y_1(n)$) to produce the first transmission signal ($b_1(n)$), which may include cross-modulation products resulting from the second transmission signal ($b_2(n)$) (e.g., a coupled transmission signal) and may be output by the first antenna 54A.

The total interference signal ($y_{c1}(n)$) may also be expressed as the product of a vector, H (e.g., $H_1$, $H_2$), which may include the set of weight factors, $h_{i,j}(m)$, and a basis function ($\Phi$). For instance, the total interference signal ($y_{c1}(n)$) may be expressed as:

$$y_{c1}(n) = H \cdot \Phi,$$

where $H_1$ may be represented by the 3M×1 vector, $[h_{1,1}(1), h_{1,1}(2), \ldots h_{1,1}(M), h_{3,1}(1), \ldots h_{3,1}(M), h_{3,2}(1), \ldots h_{3,2}(M)]^T$, and the basis function ($\Phi$) corresponding to the first transmission signal, may be represented by the 1×3M vector, $[x_2(n), x_2(n-1), \ldots, x_2(n-M), +|x_1(n)|^2 x_2(n), \ldots, |x_1(n)|^2 x_2(n-M), x_1^2(n) x_2^*(n), \ldots, x_1^2(n) x_2^*(n-M)]$. Accordingly, the MIMO IMD cancellation block 90 may determine the basis function ($\Phi$) based on the expected signal ($x_1(n)$) and the expected coupled signal ($x_2(n)$) received from the first MIMO transmitter 52A and the second MIMO transmitter 52B, respectively. Further, in some embodiments, the training engine 92 may calculate the set of weight factors (H) based in part on the first transmission signal ($b_1(n)$) transmitted at the first MIMO transmitter 52A and captured on the feedback receiver path 68. For instance, the set of weight factors (H) may be determined from the equation:

$$A \cdot H = e_1,$$

where A represents a matrix:

$$A = \begin{bmatrix} \Phi(1) \\ \Phi(2) \\ \vdots \\ \Phi(N) \end{bmatrix},$$

where N represents a certain number (e.g., 2000), and $e_1$ represents the error function:

$$e_1(n) = b_1(n) - x_1(n).$$

Accordingly, the training engine 92 may solve for the set of weight factors (H) using a normalized least mean squares and/or a recursive least square algorithm. Moreover, in some embodiments, the training engine 92 may calculate the set of weight factors with a regular periodicity (e.g., every millisecond (ms), every 5 ms, every 10 ms, and/or the like) and/or in response to certain conditions (e.g., a change in frequency, power, and/or the like) in the transmitter 50 and/or the electronic device 10, as described in greater detail below. Accordingly, the training engine 92 and/or the MIMO IMD cancellation block 90 may store the most recently calculated set of weight factors in a storage location, such as memory 14, nonvolatile storage 16, and/or a look up table (LUT), and may update the stored values of the set of weight factors after subsequent calculations of the set of weight factors. In such embodiments, the mixing product calculation and scaling block 94 may receive and/or retrieve the set of weight factors from the storage location. Further, in some embodiments, the storage location may be initialized (e.g., calibrated) with an initial set of weight factors, which the MIMO and IMD cancellation block 90 may use to adjust an initial expected first signal when a first transmission signal is not available (e.g., captured) and/or has not been transmitted at the first antenna MA yet. To facilitate a more rapid convergence of the error function below a certain threshold, which may approach zero (e.g., no error), the initial set of weight factors may include one or more non-zero weight factors.

For simplicity, equations described above with reference to FIG. 9 are described in the context of the first MIMO transmitter 52A. For example, the expected second signal ($x_2(n)$) is described herein as an expected coupled signal relative to the expected first signal. Moreover, the predicted mixing products ($y_{c1}(n)$) are determined to be injected into the first expected signal ($x_1(n)$). However, it may be appreciated that the first expected signal ($x_1(n)$) may be described as an expected coupled signal with respect to the second expected signal ($x_2(n)$). Accordingly, the techniques described herein may be applied to predict and cancel the cross-modulation products in the second MIMO transmitter 52B. Moreover, in embodiments with additional transmission signals transmitted concurrently with the first and second transmission signals (e.g., additional antennas 54), the techniques may be extended to include the cross-modulation and/or distortion contributed by the additional transmission signals. Additionally or alternatively, the techniques may be extended to include higher order cross-modulation product harmonics and/or may rely on an alternative model. Thus, embodiments described herein are intended to be illustrative and not limiting.

Figure 10:
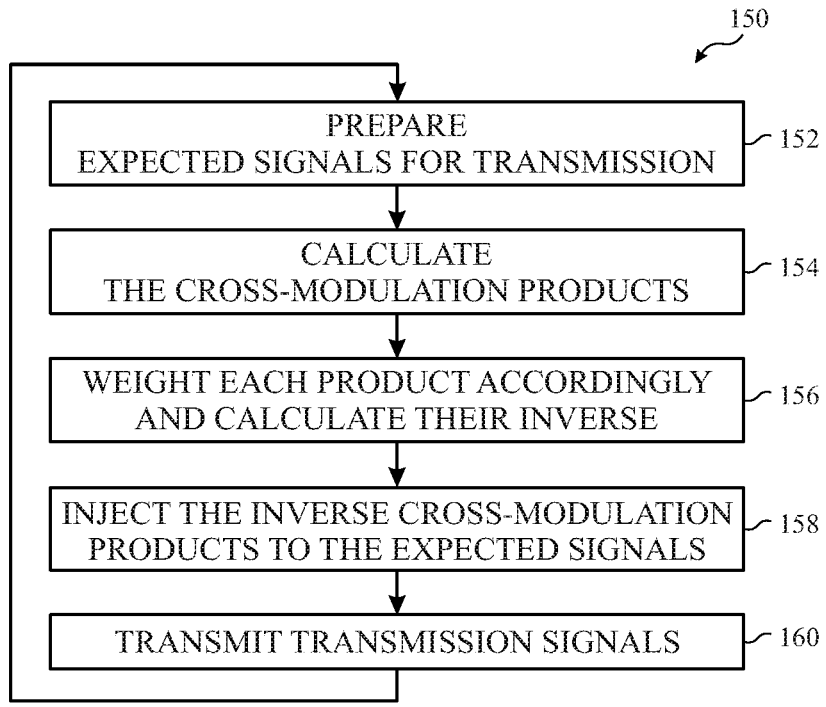
FIG. 10 is a block diagram of a method for operating the transmitter of FIG. 8 in an UL-MIMO mode, in accordance with an embodiment.

Turning now to FIG. 10, a flow chart of a method 150 for operating the transmitter 50 in an UL-MIMO mode while minimizing the presence of mixing products in signal transmissions is shown, in accordance with embodiments described herein. Although the description of the method 150 is described in a particular order, which represents a particular embodiment, it should be noted that the method 150 may be performed in any suitable order, and steps may be added or omitted.

To initiate the method 150, the transmitter 50 may prepare expected signals for transmission (process block 152). More specifically, the transmitter 50 may prepare a respective expected signal at each of the MIMO transmitters 52 included in the transmitter 50 for simultaneous transmission in the same frequency band. For example, the first MIMO transmitter 52A may determine and/or receive the first expected signal ($x_1(n)$) using the digital transmitter circuitry 56. Further, the second MIMO transmitter 52B may determine and/or receive the second expected signal ($x_2(n)$) in the same frequency band as the first expected signal using the digital transmitter circuitry 56.

The transmitter 50 may additionally calculate (e.g., predict) the cross-modulation products that may be introduced to the expected signals (e.g., the first expected signal, the second expected signal) during transmission (process block 154). For example, as discussed above, the MIMO IMD cancellation block 90 of the transmitter may calculate (e.g., estimate) the mixing products for each of the expected signals based in part on the expected signals and their respective expected coupled signals. For instance, in the example described with reference to FIG. 9, to calculate the mixing products of the expected first signal, the MIMO IMD cancellation block 90 may use the expected first signal and the second expected signal (e.g., an expected coupled signal relative to the expected first signal). Moreover, in other embodiments, the MIMO IMD cancellation block 90 may use the expected first signal and any suitable number of expected coupled signals, which may each correspond to an expected signal to be simultaneously transmitted along with the expected first signal at another MIMO transmitter 52 proximate to the first MIMO transmitter 52A (e.g., within the transmitter 50 and/or within the electronic device 10). Further, in some embodiments, the MIMO IMD cancellation block 90 may predict the mixing products using a simplified Volterra model.

The transmitter 50 may also weight (e.g., scale) each cross-modulation product and calculate the inverse of the result (process block 156). As described in greater detail below, the transmitter 50 may determine a set of weight factors (e.g., coefficients) to scale the cross-modulation products according to their respective contribution to the distortion of the transmission signal using the MIMO IMD cancellation block 90. In some embodiments, for example, the training engine 92 of the MIMO IMD cancellation block may calculate the set of weight factors ($H_1$) based in part on the signal transmitted by the first MIMO transmitter 52A (e.g., the first transmission signal), which may include intermodulation product distortion. Further, the training engine 92 of the MIMO IMD cancellation block may calculate the set of weight factors ($H_2$) based in part on the signal transmitted by the second MIMO transmitter 52B (e.g., the second transmission signal), which may also include intermodulation product distortion. As discussed in greater detail below, the transmitter 50 may determine the set of weight factors with a certain periodicity and/or in response to a certain event and/or device condition.

Moreover, the transmitter 50 may calculate the inverse of the scaled cross-modulation products (e.g., $-y_{c1}(n)$, $-y_{c2}(n)$) such that the inverse of the scaled cross-modulation products may be injected to the respective expected signals (process block 158). Accordingly, the MIMO transmitters 52 may receive respective inverse scaled cross-modulation products from the MIMO IMD cancellation block 90. The MIMO transmitters 52 may then add the respective inverse of the scaled cross-modulation products to a respective expected signal to cancel the respective scaled cross-modulation products from the respective expected signal. As such, in other embodiments, the MIMO transmitters 52 may receive the respective scaled cross-modulation products from the MIMO IMD cancellation block 90 and may subtract these from a respective expected signal. In some cases, the MIMO transmitters 52 may perform additional signal adjustments (e.g., at the DPD and ET engine 58) to produce a respective updated signal (e.g., ($y_1(n)$), ($y_2(n)$)) to be transmitted.

The transmitter 50 may then transmit signals (process block 160). In some embodiments, the updated signal (e.g., ($y_1(n)$), ($y_2(n)$)) may be modified (e.g., distorted) by cross-modulation products at the power amplifier 64 of the respective MIMO transmitter 52 (e.g., 52A, 52B). Accordingly, the transmitter 50 may transmit a first transmission signal ($b_1(n)$) at the first antenna 54A via the first MIMO transmitter 52A. Further, the transmitter 50 may transmit a second transmission signal ($b_2(n)$) at the second antenna 54B via the second MIMO transmitter 52B. In some embodiments, because the transmitter 50 the respective predicted inverse of the cross-modulation products were injected into the respective expected signals, the distortion introduced in the transmission signals due to cross-modulation products may be reduced. For instance, in some embodiments, the error between an expected signal and the corresponding transmission signal may be minimized compared to a transmission signal prepared from the expected signal using other techniques.

It may be appreciated that the transmitter 50 may perform the method 150 in real-time. That is, for example, the transmitter 50 may continue to calculate updated cross-modulation products as additional expected signals are prepared for transmission and may continue to inject the inverse of the scaled updated cross-modulation products into the additional expected signals. Accordingly, the method 150 and/or a portion of the method 150 may be repeated any suitable number of instances. However, in some embodiments, the transmitter 50 may be implemented to perform the method 150 when operating in an UL-MIMO mode.

Figure 11:
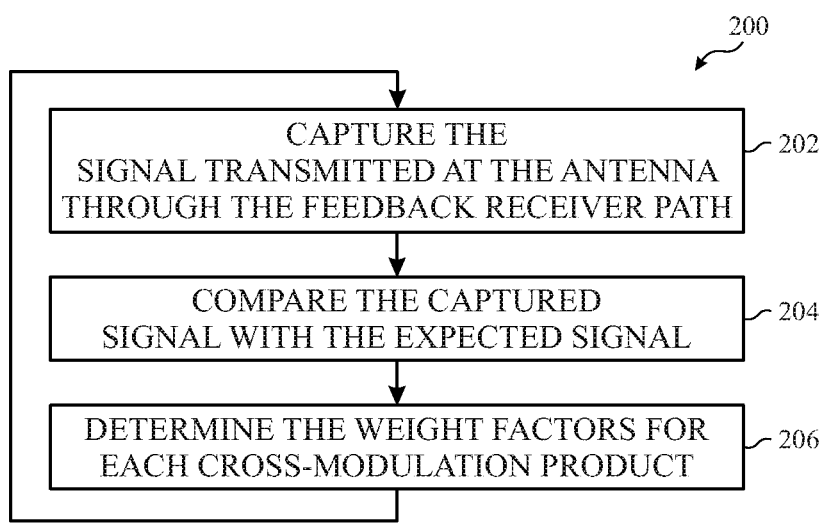
FIG. 11 is a block diagram of a method for calculating a set of weight factors used to scale cross-modulation products predicted according to the method of FIG. 10, in accordance with an embodiment.

Turning now to FIG. 11, a flow chart of a method 200 for calculating (e.g., training) the set of weight factors (H) used to scale the cross-modulation products, as described above with reference to process block 156, is illustrated. The method 200 may be used with a regular periodicity (e.g., every millisecond (ms), every 5 ms, every 10 ms, and/or the like) and/or in response to certain conditions (e.g., a result of the error function, a change in frequency, power, and/or the like) in the transmitter 50 and/or the electronic device 10. Further, although the description of the method 200 is described in a particular order, which represents a particular embodiment, it should be noted that the method 200 may be performed in any suitable order, and steps may be added or omitted.

To initiate the method 200, the transmitter 50 may capture the signals transmitted at the antennas 54 (e.g., the transmission signals) (process block 202). More specifically, the feedback receiver paths 68 of each of the MIMO transmitters 52 may route the respective transmission signals to the MIMO IMD cancellation block 90. Accordingly, for the embodiment illustrated in FIG. 9, the training engine 92 of the MIMO cancellation block 90 may receive the first transmission signal ($b_1(n)$) from the feedback receiver path 68 of the first MIMO transmitter 52A and may receive the second transmission signal ($b_2(n)$) from the feedback receiver path 68 of the second MIMO transmitter 52B.

The MIMO cancellation block 90 of the transmitter 50 may then compare the captured signals (e.g., the transmission signals) with corresponding expected signals (process block 204). For example, the training engine 92 may determine the difference between an expected signal and the resulting transmission signal, which may correspond to the error signal (e) (e.g., error function), as described above. Using this comparison, the transmitter 50 may then determine the set of weight factors corresponding to the cross-modulation product terms for each expected signal (process block 206). In some embodiments, for example, the MIMO IMD cancellation block 90 may determine the set of weight factors based in part on both the cross-modulation product terms and the comparison (e.g., the error signal). As described above, the determined set of weight factors may then be used to scale predicted cross-modulation products.

Further, in some embodiments, the method 200 may be repeated any suitable number of instances. For example, in some embodiments, the method 200 may be repeated at regular intervals (e.g., every millisecond (ms), every 5 ms, every 10 ms, and/or the like). Moreover, the interval may be selected to minimize an impact on the power consumption of the electronic device 10 and/or to minimize the intermodulation products present in a signal transmitted by the transmitter 50. For example, in some embodiments, a smaller interval may reduce the intermodulation products present in the transmitted signal (e.g., reduce the result of the error function), as the set of weight factors may be determined more regularly. However, the smaller interval may increase the power consumption of the electronic device, as the calculations involved in the method 200 are performed more frequently. Accordingly, the method 200 may additionally or alternatively be performed based in part on a certain event and/or device condition (e.g., frequency, power, and/or the like). For example, in some embodiments, the transmitter 50 may perform the method 200 during a high-power mode of the electronic device 10 and may not update the set of weight factors during a lower-power mode of the electronic device 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A transmitter configured to concurrently transmit a first transmission signal via a first antenna and a second transmission signal via a second antenna, comprising:
   a first multiple-input, multiple-output (MIMO) transmitter communicatively coupled to the first antenna, wherein the first MIMO transmitter is configured to prepare an expected first signal for transmission via the first antenna and to transmit the first transmission signal at the first antenna based at least in part on the expected first signal;
   a second multiple-input, multiple-output (MIMO) transmitter communicatively coupled to the second antenna, wherein the second MIMO transmitter is configured to prepare an expected second signal for transmission via the second antenna and to transmit the second transmission signal at the second antenna based at least in part on the expected second signal, wherein the expected second signal is in the same frequency band as the expected first signal; and
   multiple-input, multiple-output intermodulation distortion (MIMO IMD) cancellation circuitry communicatively coupled to the first MIMO transmitter and the second MIMO transmitter, wherein the MIMO IMD cancellation circuitry is configured to:
   receive the expected first signal from the first MIMO transmitter;
   receive the expected second signal from the second MIMO transmitter;
   determine a first set of cross-modulation products based at least in part on the expected first signal, the expected second signal, and a first set of weight factors; and
   inject the inverse of the first set of cross-modulation products into the expected first signal at the first MIMO transmitter.

2. The transmitter of claim 1, wherein the transmitter is configured to operate in an uplink multiple-input, multiple-output (UL-MIMO) mode to concurrently transmit the first transmission signal and the second transmission signal.

3. The transmitter of claim 1, wherein the transmitter is configured to support data communication over a 5th generation (5G) cellular network, a long term evolution (LTE) cellular network, or a combination thereof.

4. The transmitter of claim 1, wherein the first MIMO transmitter comprises a nonlinear circuit element, and wherein, the first transmission signal comprises the expected first signal and nonlinear interference produced by the nonlinear circuit element.

5. The transmitter of claim 4, wherein the nonlinear circuit element comprises a power amplifier.

6. The transmitter of claim 1, wherein the MIMO IMD cancellation circuitry is configured to:
   receive the first transmission signal from the first MIMO transmitter;
   compare the first transmission signal with the expected first signal; and
   determine the first set of weight factors based at least in part on the comparison of the expected first signal and the first transmission signal.

7. The transmitter of claim 6, wherein receiving the first transmission signal comprises receiving a discrete time representation of the first transmission signal sampled at twice a Nyquist rate of a bandwidth of a channel implemented to carry the first transmission signal, the second transmission signal, or both.

8. The transmitter of claim 1, wherein the MIMO IMD cancellation circuitry is configured to predict the first set of cross-modulation products based at least in part on a Volterra model.

9. The transmitter of claim 1, wherein the MIMO IMD cancellation circuitry is configured to:
   determine a second set of weight factors based in part on the second transmission signal and the expected second signal;
   determine a second set of cross-modulation products based at least in part on the expected first signal, the expected second signal, and the second set of weight factors; and
   inject the inverse of the second set of cross-modulation products into the expected second signal at the second MIMO transmitter.

10. The transmitter of claim 1, wherein the first set of cross-modulation products comprise at least third order cross-modulation products of a cross-modulation of the expected first signal cross with the expected second signal.

11. The transmitter of claim 1, wherein the first MIMO transmitter comprises:
    digital transmitter circuitry configured to identify the expected first signal;
    digital pre-distortion and envelope tracking circuitry communicatively coupled to the digital transmitter circuitry and configured to:
    receive a feedback signal from digital signal processing circuitry of the first MIMO transmitter; and
    modify the expected first signal to offset distortion introduced by a power amplifier of the first MIMO transmitter in the first transmission signal based at least in part on the feedback signal and to produce an updated first signal;
    a digital-to-analog converter (DAC) configured to convert the updated first signal from a digital signal to an analog signal to generate a first analog signal; and
    envelope tracking circuitry configured to regulate power supplied to the power amplifier based at least in part on an envelope of the expected first signal, wherein the power amplifier is configured to amplify the first analog signal based at least in part on the regulated power to produce the first transmission signal.

12. The transmitter of claim 1, wherein the first MIMO transmitter comprises a feedback receiver path communicatively coupled to the MIMO IMD cancellation block and configured to route the first transmission signal to the MIMO cancellation block, wherein the feedback receiver path comprises:

an analog-to-digital converter (ADC) configured to convert the first transmission signal from an analog signal to a digital signal.

13. A method of operating a transmitter in an uplink multiple-input, multiple-output (UL-MIMO) mode, comprising:
receiving, at multiple-input, multiple-output intermodulation distortion (MIMO IMD) cancellation circuitry communicatively coupled to a first MIMO transmitter of the transmitter, an expected first signal, wherein the first MIMO transmitter is configured to prepare the expected first signal for transmission at a first antenna of the transmitter;
receiving, at the MIMO IMD cancellation circuitry, an expected second signal from a second MIMO transmitter of the transmitter communicatively coupled to the MIMO IMD cancellation circuitry, wherein the second MIMO transmitter is configured to prepare the expected second signal for transmission at a second antenna of the transmitter, wherein the expected second signal is in the same frequency band as the expected first signal;
determining, using the MIMO IMD cancellation circuitry, a first set of cross-modulation products based at least in part on the expected first signal, the expected second signal, and a first set of weight factors;
injecting the inverse of the first set of cross-modulation products into the expected first signal at the first MIMO transmitter to produce an updated first signal; and
transmitting, at the first antenna, a first transmission signal based in part on the updated first signal.

14. The method of claim 13, comprising determining, using the MIMO IMD cancellation circuitry, the first set of weight factors, wherein determining the first set of weight factors comprises:
capturing, at a feedback receiver path of the first MIMO transmitter, the first transmission signal;
comparing, using the MIMO IMD cancellation circuitry, the captured first transmission signal with the expected first signal; and
determining the first set of weight factors based at least in part on the comparison.

15. The method of claim 14, comprising determining the first set of weight factors with a regular periodicity.

16. The method of claim 14, comprising determining the first set of weight factors in response to a change in frequency and/or power supplied to the transmitter.

17. The method of claim 14, comprising determining, using the MIMO IMD cancellation circuitry, the first set of weight factors, wherein determining the first set of weight factors comprises:
retrieving the first set of weight factors from non-transitory memory, wherein the non-transitory memory is initialized with the first set of weight factors, and, wherein, the first set of weight factors comprise at least one non-zero weight factor.

18. A method of operating a multiple-input, multiple-output intermodulation distortion (MIMO IMD) cancellation circuitry of a transmitter operating in an uplink multiple-input, multiple-output (UL-MIMO) mode, comprising:
receiving, at first input circuitry of the MIMO IMD cancellation block, a first transmission signal captured at a first feedback receiver path of a first MIMO transmitter of the transmitter, wherein the first input circuitry is communicatively coupled to the first MIMO transmitter;
receiving, at second input circuitry of the MIMO IMD cancellation circuitry, an expected first signal from the first MIMO transmitter, wherein the second input circuitry is communicatively coupled to the first MIMO transmitter, and, wherein the first MIMO transmitter is configured to prepare the expected first signal for transmission at a first antenna of the transmitter;
receiving, at third input circuitry of the MIMO IMD cancellation circuitry, an expected second signal from a second MIMO transmitter of the transmitter, wherein the third input circuitry is communicatively coupled to the second MIMO transmitter, and, wherein the second MIMO transmitter is configured to prepare the expected second signal for transmission at a second antenna of the transmitter;
comparing, using training circuitry of the MIMO cancellation circuitry, the first transmission signal with the expected first signal;
determining, using the training circuitry, a first set of weight factors based at least in part on the comparison of the first transmission signal and the expected first signal;
scaling, using mixing product calculation and scaling circuitry of the MIMO IMD cancellation circuitry, a first set of cross-modulation products based at least in part on the first set of weight factors to produce a first set of scaled cross-modulation products, wherein the mixing product calculation and scaling circuitry is configured to determine the first set of cross-modulation products based at least in part on the first expected signal and the second expected signal; and
outputting, using mixing product calculation and scaling circuitry of the MIMO IMD cancellation circuitry, the inverse of the first set of scaled cross-modulation products to the first MIMO transmitter.

19. The method of claim 18, wherein receiving the expected first signal comprises sampling the expected first signal in discrete time to produce a sampled first signal, wherein receiving the expected second signal comprises sampling the expected second signal in discrete time to produce a sampled second signal, and, wherein the mixing product calculation and scaling circuitry is configured to determine the first set of cross-modulation products based at least in part on the first sampled signal and the second sampled signal delayed by one or more samples.

20. The method of claim 18, comprising:
receiving, at fourth input circuitry of the MIMO IMD cancellation block, a second transmission signal captured at a second feedback receiver path of the second MIMO, wherein the fourth input circuitry is communicatively coupled to the second MIMO transmitter;
comparing, using training circuitry of the MIMO cancellation circuitry, the second transmission signal with the expected second signal;
determining, using the training circuitry, a second set of weight factors based at least in part on the comparison of the second transmission signal and the expected second signal;
scaling, using the mixing product calculation and scaling circuitry of the MIMO IMD cancellation circuitry, a second set of cross-modulation products based at least in part on the second set of weight factors to produce a second set of scaled cross-modulation products, wherein the mixing product calculation and scaling circuitry is configured to determine the second set of cross-modulation products based at least in part on the first expected signal and the second expected signal; and outputting, using mixing product calculation and scaling circuitry of the MIMO IMD cancellation circuitry, the inverse of the second set of scaled cross-modulation products to the second MIMO transmitter.

\* \* \* \* \*